June 25, 1946.  F. W. STEWART ET AL  2,402,708
APPARATUS FOR COOLING MOLDS
Filed July 12, 1943   2 Sheets-Sheet 1

INVENTOR.
FREDERICK WILLIAM STEWART
MATTHEW JAMES KELLY
BY ASHLEY J. REEK
George J. Crominger
ATTORNEY.

June 25, 1946.  F. W. STEWART ET AL  2,402,708
APPARATUS FOR COOLING MOLDS
Filed July 12, 1943  2 Sheets-Sheet 2

INVENTOR.
FREDERICK WILLIAM STEWART
MATTHEW JAMES KELLY
BY ASHLEY J. REEK

George J. Croninger
ATTORNEY.

Patented June 25, 1946

2,402,708

UNITED STATES PATENT OFFICE 2,402,708

APPARATUS FOR COOLING MOLDS

Frederick William Stewart, Weston, W. Va., Ashley J. Reek, Carrick, Pa., and Matthew James Kelly, Elkins, W. Va., assignors to Kelly Foundry and Machine Company, Elkins, W. Va.

Original application May 1, 1940, Serial No. 332,662., now Patent No. 2,329,012, September 7, 1943. Divided and this application July 12, 1943, Serial No. 494,270

2 Claims. (Cl. 49—40)

This is a division of our co-pending application Serial No. 332,662, filed May 1, 1940, pursuant to which Letters Patent No. 2,329,012 were issued on September 7, 1943.

This invention relates to apparatus for the manufacture of glassware. It has to do particularly with a paste mold machine wherein the molds are mounted on a rotatable table, the blow pipes being placed on and removed from the machine by hand.

One object of this invention is the provision of an improved mold cooling system, said system being substantially closed and self contained, the equipment necessary to the operation thereof being built into and transportable with the machine.

Another object is to provide in a mold cooling system means enabling an increase in the amount of heat dissipated thereby increasing the capacity of the system for cooling purposes. Another object is to provide for the settling out of sediment and other foreign matter which might otherwise clog the supply lines and spray heads or mark the ware if sprayed thereon.

Other objects and advantageous features will be noted in the following detailed description and accompanying drawings wherein like characters of reference designate corresponding parts and wherein.

Figure 4:
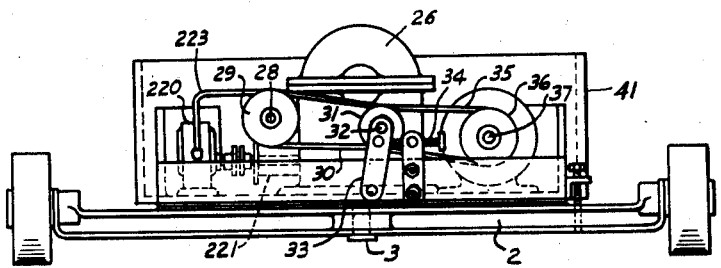
Figure 4 is a view of the right hand side of the machine base.

The numeral 1 designates the base of the machine shown as a wheeled truck, with axles 2 mounted on center pivots 3 so that the machine may be turned on a short radius and moved from one location to another. A locking pin 2a is provided for each axle which is withdrawn before the axle may be swivelled. The base is formed with a compartmented center section and right and left aproned platforms 6 and 7 respectively, Figures 1, 2 and 3, the drive motor 8 and associated drive mechanism being mounted on platform 6 and the air compressor 9, the compressed air tank 9a, motor 10 and other apparatus associated therewith mounted on platform 7 the details of which are fully described in our application Serial No. 332,662, filed May 1, 1940, now Patent 2,329,012.

Figure 1:
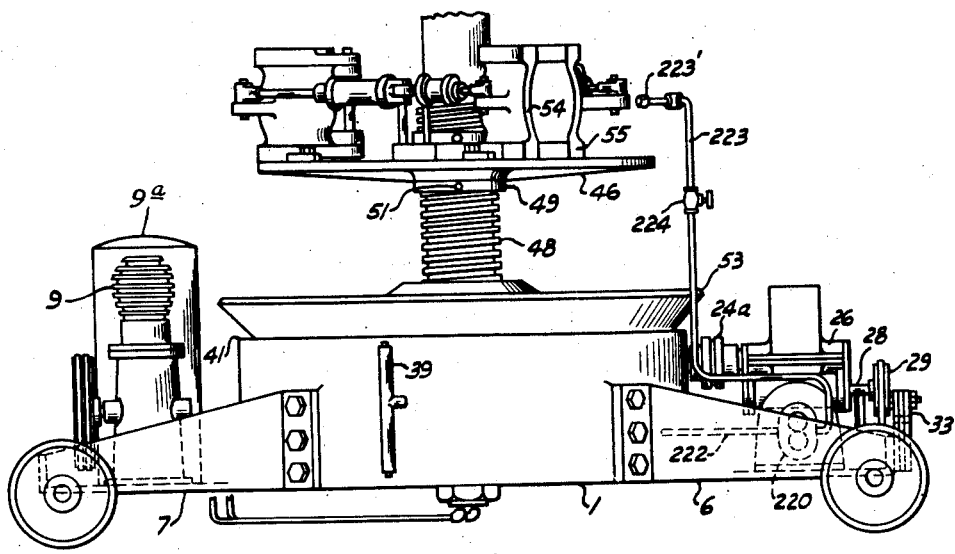
Figure 1 is an elevation of the base of the preferred form of paste mold glass machine with which the novel apparatus for cooling blow molds is associated, the upper portion of the machine being omitted.
Figure 2:
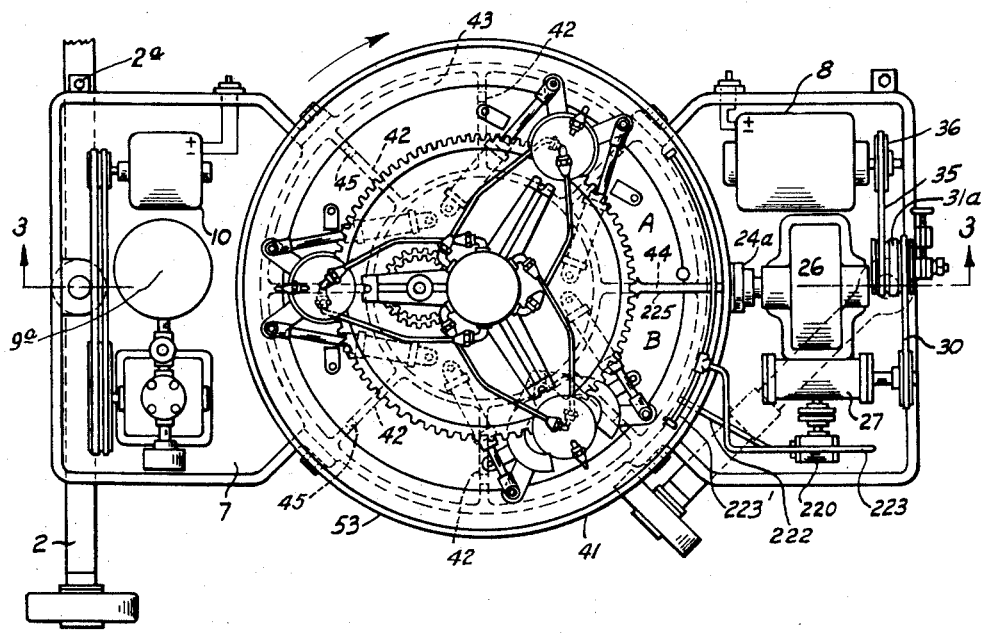
Figure 2 is a top plan view of the whole of the machine of which only the base and the mold table with the molds thereon is shown in Figure 1.
Figure 3:
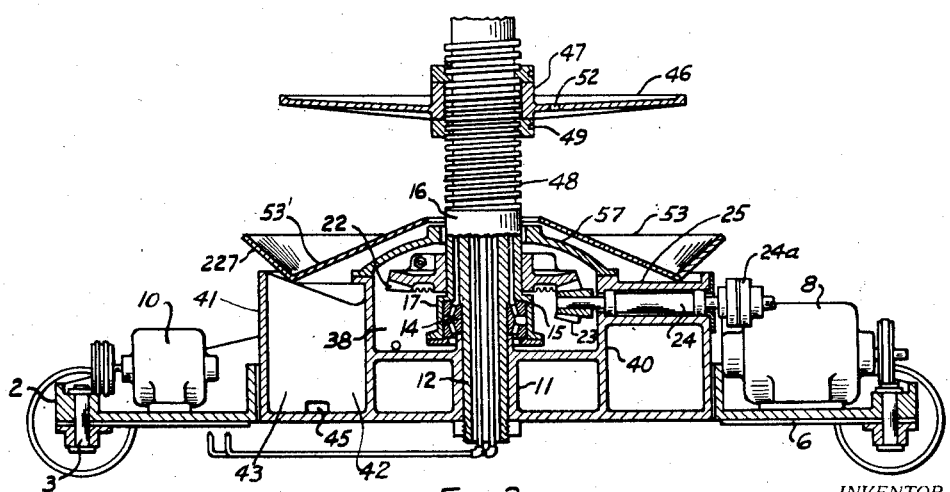
Figure 3 is a vertical section through the lower portion of the machine taken along the line 3—3 in Fig. 2, parts including the compressed air tank and the reduction gear housing being omitted for the sake of clearness.

Said base is provided with an axial vertically disposed hub 11 in which is fixed a hollow vertical standard 12, Figure 3, with a spherical anti-friction bearing 14 thereon resting on top of hub 11. An annular shoulder 15 on standard 12 bears against the bearing and the entire assembly is tightened down by nut 13 on the threaded lower end of standard 12. The bearing 14 rotatably supports a hollow column 16 having an annular enlargement 17 which fits over the outside of the bearing, said standard extending above the column as shown in Figures 1 and 2. The spherical bearing will permit 4° deflection of the column from the vertical.

Near the bottom of the column 16 and around the perimeter thereof is an annular gear 22, Figure 3, which meshes with a drive pinion 23 on driven shaft 24 journaled in housing 25 whereby the column is rotated. 26, Figure 2, designates a housing enclosing compound reduction gearing to which shaft 24 is connected by coupling 24a and in housing 27 is a worm gear having a worm shaft 28, Figures 2 and 4, on which a pulley 29 is mounted driven by belt 30. 31 is the three part double groove pulley, Figures 2 and 4, of a speed reducer, the pulley being mounted on a shaft 32 supported by a pivoted lever 33, the angular position of which is adjusted by screw 34. Belt 30 seats in the right hand groove of pulley 31, Figure 2, and belt 35 connected to pulley 36 on motor shaft 37 is seated in the left hand groove. By changing the angular position of lever 33, one belt is tightened and the other loosened, the depth of the grooves being varied automatically due to a center section 31a of pulley 31 being shiftable on shaft 32.

As indicated by arrows in Figure 2, the direction of rotation of column 16 is clockwise.

A fluid tight cover 57, Figure 3, closes an oil compartment 38 surrounding the spherical bearing 14, gear 22 and pinion 23. Said compartment is filled with oil through externally located pipe 39, Figure 1. The pipe has a drain plug at the lower end. Surrounding the wall 40 of this compartment and spaced therefrom is an annular upstanding flange 41 having radially extending vertical webs 42 spaced at 45° which are joined to the wall 40 thereby forming a series of open top compartments 43. Each web, except web 44, has a centrally located opening 45 therethrough near the floor of the compartment thereby connecting adjacent compartments and enabling cooling fluid to pass from one to the other as will later be described in detail.

46 is the circular mold table, Figure 3, provided with an axial hub 47 which fits over column 16, said table being rotatable therewith. The column is threaded externally at 48 and both the table and column have contiguous key slots in which key 4 is located. The table is vertically adjustable on the column by means of screw collars 49 and 50 which are screwed on the column 16 beneath and above the table respectively. Radial sockets 51 are provided in each collar for the insertion of a tool for rotating and tightening the collars.

The table is provided with one or more holes 52 for draining sprayed water into an annular drip pan 53 therebelow, the surface of the table sloping slightly toward the center where the holes are positioned.

The table of the machine has three molds located on 120° centers as will be noted in Figure 2. These molds are made in separable sections 54 and 55 respectively and the molding cavity which is formed when the sections are closed may be of any desired contour to suit production requirements. Also the number of molds utilized is not limited to three in number and may be increased within practical limits. A detailed description of the actuating mechanism for opening and closing said molds will be found in the parent application hereof.

It is desired to cool the molds by spraying cooling fluid thereinto and to recover the fluid and recirculate it. 220, Figures 2 and 4, is a pump driven off the reduction gearing in housing 26 by a worm in housing 221. The inlet side of the pump is connected with a fluid reservoir in the base of the machine by a line 222 and the outlet side of the pump is connected to a pipe 223 having a spray nozzle 223', Figure 1, located at the perimeter of the mold table and directed toward said molds, 54—55, there being a valve 224 in said line for control purposes.

Figure 5:
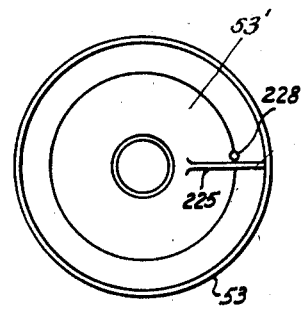
Figure 5 is a plan view of the drip pan on a reduced scale.

Sprayed fluid drains through the apertures in table 46 onto the surface of a collecting pan 53 superimposed on the base and supported on tops of webs 42. This pan, Figure 3, is constructed with a frusto-conical center section 53' and has a radial upstanding rib 225 which act as a barrier to the flow of fluid connecting in the trough formed by the juncture of the frusto-conical section and the wide flaring brim flange 227, Fig. 5. It is desired that the trough have about a 1° drop so that fluid will flow by gravity in the direction of the arrow into a drain hole 228 at the lowest point of the trough adjacent the rib and will drain therefrom into the compartment A above the radial rib 44, Figure 2, due to the position of the pan on the base. The fluid will pass slowly from compartment to compartment in the base through the communicating passages 45 and will be drawn off from compartment B by the pump, sediment settling out of the same during the progress. In this manner the fluid is caused to follow a circuitous path reversing itself once in the process and coming in contact with a large area of heat radiating surface so that by the time it is drawn into the pump again it will be appreciably cooled.

We claim:

1. In a glass forming machine, the combination of a base, a column rotatably supported by the base, a mold table mounted on the column above the base, an annular series of molds mounted on the table, the upper surface of the table being dished toward the column and provided with holes through which liquid may drain, an annular pan mounted below the table and coaxial therewith to receive the liquid that drains from the holes in the mold table, a pump having inlet and outlet connections mounted on the base, a nozzle to direct cooling liquid on the molds as they pass in turn when the mold table rotates, and means to direct the liquid from the pan to the pump and from the pump to the nozzle.

2. In a glass forming machine, the combination of a hollow base having a series of spaced partitions forming a plurality of compartments, a column rotatably supported by the base, a mold table mounted on the column above the base, an annular series of molds mounted on the mold table, the upper surface of the mold table being dished toward the column and provided with holes through which liquid may drain, an annular pan mounted below the mold table and coaxial therewith to receive the liquid that drains from the holes in the mold table and provided with an opening for draining the liquid from the pan into one of the compartments, said compartments being connected in series by openings to retard the flow of liquid to the compartment last receiving the liquid, a pump having an inlet and an outlet and mounted on the base, a pipe connecting the pump inlet to the compartment last receiving the liquid, a nozzle for directing a spray on the molds as they pass in turn when the mold table rotates, a second pipe connecting the pump outlet to the nozzle to spray cooling liquid on the molds.

FREDERICK WILLIAM STEWART.
ASHLEY J. REEK.
MATTHEW JAMES KELLY.